June 17, 1941.   W. G. WALLACE   2,246,117

TIRE AND RIM ASSEMBLY

Filed Nov. 24, 1939

INVENTOR
WILLIAM G. WALLACE
BY Robert E. Harris.
ATTORNEY

Patented June 17, 1941

2,246,117

UNITED STATES PATENT OFFICE 2,246,117

TIRE AND RIM ASSEMBLY

William G. Wallace, Burwell, Nebr.

Application November 24, 1939, Serial No. 305,808

2 Claims. (Cl. 152—158)

This invention relates to an improved pneumatic tire and rim assembly.

More specifically the invention relates to an improved tire of this kind which is particularly adapted for use on the traction wheels of tractors, trucks and similar heavy duty vehicles.

One of the main objects of the invention is the provision of a tire of this kind which has a relatively wide substantially transversely flat traction surface in comparison with the traction surface of conventional tires of this kind and in comparison to its radial thickness.

Another object of the invention is the provision of a composite tire and rim assembly in which a metal rim structure and flexible tire portion are substantially hermatically sealed together.

A further object of the invention is the provision of an improved hermatically sealed connection, in an assembly of this kind, between the side walls of the tire and the rim by which is accommodated relatively extended inward deflection of the side walls of the tire without rim cutting the latter or breaking the seal between the tire and the rim.

Still further objects of the invention are the provision of a tire of this character which is particularly adapted to be filled with air under pressure or fluid; to provide means in a tire of this kind for limiting flattening or collapsing thereof when punctured; and to provide an improved heavy duty tire which is so constructed and predetermined in varying wall thickness as to retain its tread surface in substantially cylindrical contour when inflated so as to present when under load a substantially flat traction surface of relatively large area and transverse dimension.

Additional objects of the invention are the provision in a tire and rim assembly of this character of rim carried tire wall attaching beads which extend outwardly laterally beyond all of main portions of the tire side wall so as to protect the latter against abrasion and which serve to present additional traction surface area when the tire portion of the assembly sinks into mud, sand or other unfirm bodies; to provide, in an embodiment of the invention, abutment stops on the tire part of the assembly which are engageable with the rim beads after predetermined deflection of the tire due to load conditions or deflation and which are adapted to thus apply directly upon the rim structure, independently of the sealed connection of the tire and rim, a portion of the load which the assembly is called upon to bear.

An illustrative embodiment of the invention is shown in the accompanying drawing, in which.

Figure 1:
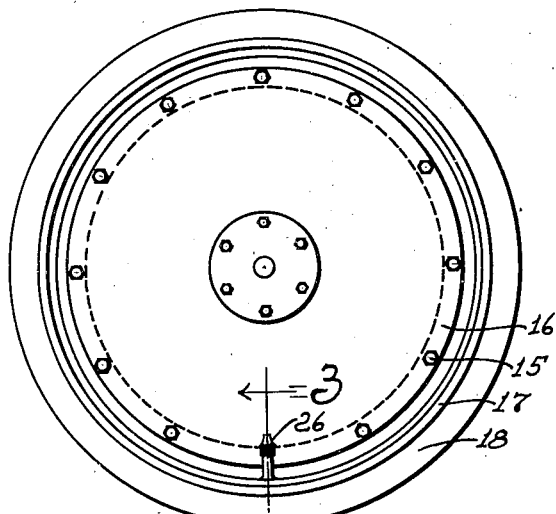
Fig. 1 is a side elevational view of a tire and rim assembly embodying the invention.
Figure 2:
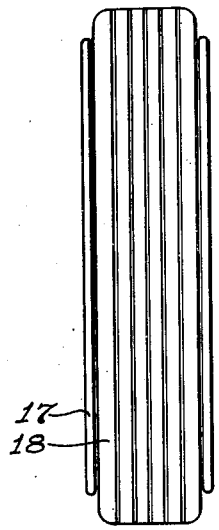
Fig. 2 is an elevational view of the periphery of the tire and rim assembly shown in Fig. 1.
Figure 3:
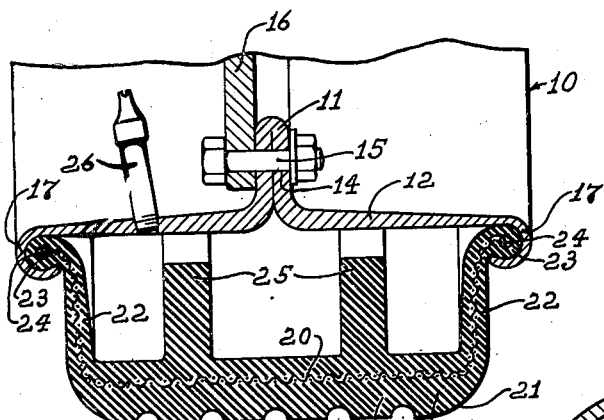
Fig. 3 is a fragmentary, transverse, vertical sectional view taken on line 3—3 of Fig. 1.

In the form of the invention illustrated in Figs. 1, 2 and 3, my improved tire and rim assembly includes a formed, integral metal rim member, generally designated by the numeral 10, having a web 11 provided by a double thickness of the metal of the rim member which extends inwardly radially of the felloe 12. The web 11 is provided with a plurality of spaced apertures 14 for receiving bolts 15 or other suitable securing means by which the rim is detachably securable to a wheel member such as the disc 16 shown in Figs. 1 and 2. Provided on the opposite edge portions of the rim 10 are beads 17 which are curled outwardly from the axis of the rim and which have inwardly facing open sides.

A tire, generally designated by the numeral 18, of substantially tire casing construction comprising a rubber body portion 19 and embedded reinforcing material such as cord 20 surrounds the rim member 10. The tire 18 has a tread portion 21 which is generally cylindrical in cross section having a comparatively transversely flat tread surface. The tread portion 21 is of substantially greater width than thickness. Opposite side walls 22, extending inwardly from the tread portion 21 are provided at their inner extremities with beads 23 which are adapted to be encompassed by the beads 17 of the rim member and which are reinforced by metal rings 24.

The side wall portions 22 extend substantially throughout their entire widths or main widths at approximately the same angular relation to the tread portion 21 and are preferably inclined outwardly slightly in order that inward flexing of the tire walls will occur in response to the application of load on the assembly, deflection as the tire engages road irregularities, and when the tire becomes deflated.

The tire beads 23 are encompassed by the rim beads 17 which are preferably firmly crimped over the tire beads in order to prevent detachment of the rim and tire when the latter is deflated. When, as in the illustrations shown in the drawing, the assembly is employed as a single tube tire construction, the tire and rim beads are brought to a hermatically sealed relation. This may be accomplished by crimping the rim beads 17 upon the tire beads 23, by cementing the inner and outer surfaces of the rim and tire beads respectively together, or by bonding these surfaces as, for example, by vulcanization of the rubber of the tire beads to the metal of the rim. The crimping may be employed with either attachment and sealing by adhesion or bonding.

Ribs 25 formed integral with the tread portion 21 and comprising yieldable material such as rubber may be provided in the interior of the tire in order to arrest and limit deflection of the tread toward the rim when the tire is deflated. The tire may be inflated through a valve member 26, of substantially conventional construction, mounted in an aperture formed in the rim member 10 and communicating with the interior of the assembly.

It should be understood that the ribs 25 may be omitted if desired and that the invention may be used in conjunction with a tire of double tube construction by inserting an inner tube, not shown, between the rim and the tire before assembly thereof.

In either the single or double tube tire constructions above described liquid or gases may be used for inflation.

Tires of the above construction have wide, flat traction surfaces of substantial area and are particularly adapted for heavy duty service such as on trucks, tractors and the like. The metal bead portions 17 extend outwardly laterally beyond the side walls of the tire and protect the same from abrasion. This occurs even when the side wall portions are deflated under load or when the tire is deflated. During deflection of the side walls the portions thereof adjacent the tire beads are not bent over metal edges of the rim structure as in conventional assemblies of this kind and thus rim cutting of the tire is guarded against. The outwardly protruding metal rim beads 17 serve to provide added traction surface when the tire sinks into mud, sand or loose gravel.

The side wall portions 22 are of tapered thickness and so constructed and proportioned with respect to the tread portion 21 as to cause the latter to retain its cylindrical contour when inflated. Those portions of the side walls adjacent the tire beads 23 thereof are preferably of curvilinear cross section and adapted to facilitate inward deflection of the adjacent tire wall parts under normal load deflection and when road irregularities are encountered as well as when the tire is deflated under load.

Figures 4, 6:
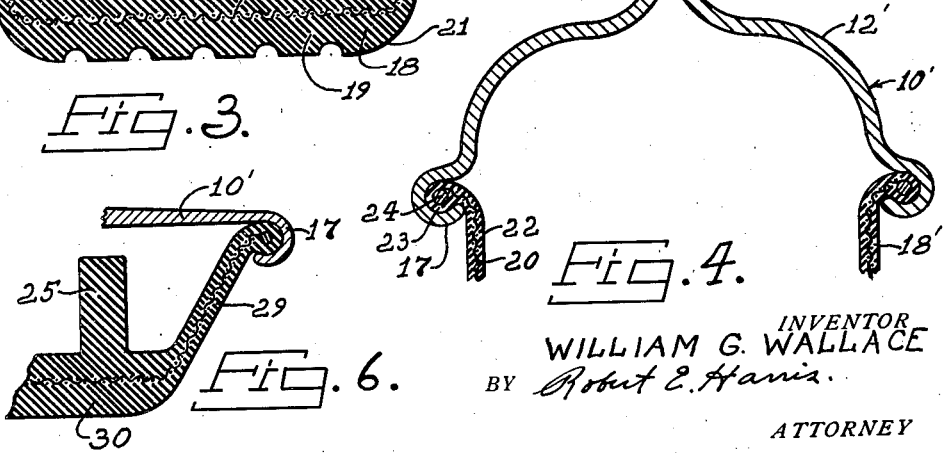
Fig. 4 is a fragmentary, transverse sectional view, similar to Fig. 3, but illustrating another embodiment of the invention.
Fig. 6 is a fragmentary, transverse, sectional view of a tire and rim assembly embodying a still further form of the invention.

In the form of the invention illustrated in Fig. 4 the rim 10' has a body portion 12' which is provided with resilient wall structures formed to outwardly concaved cross section for adding resiliency and yielding capacity to the assembly and providing a space between the rim and a tire 18' of greater volume than that of the space between the rim 10 and the tire 18 of Figs. 1 to 3, inclusive. The tire 18' is of substantially the same construction as the tire 18 and it is attached to the rim in the same manner as that described in the discussion of Figs. 1 to 3, inclusive, corresponding parts being designated by the same numerals employed in Figs. 1 to 3, inclusive.

Figure 5:
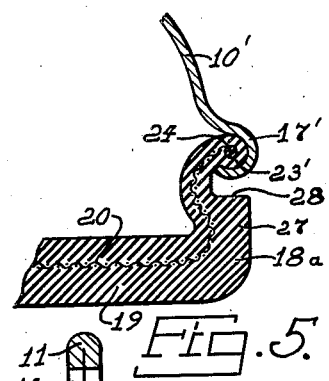
Fig. 5 is a fragmentary, transverse sectional view, similar to Figs. 3 and 4, but showing a further embodiment of the invention.

In Fig. 5 there is illustrated an embodiment of the invention in which is included a rim 10' substantially identical to the rim 10' of Fig. 4, to which is attached a tire 18a similar in construction to the tire 18 of Figs. 1 to 3, inclusive. In this form of the invention the tire and rim are secured together in the manner set forth in the description of Figs. 1 to 3, inclusive, by tire and rim beads 17' and 23', respectively. The side wall portions 27 of the tire 18a are somewhat thicker than those of the tire 18 of Figs. 1 to 3 and they are provided with laterally extending shoulders 28 which are spaced from and directly opposed to the outer surfaces of the beads 17' of the rim so as to abut the latter when the tire is deflated or excessively deformed by road irregularities in order to apply the load directly on the wall portion of the tire.

In the Fig. 5 form of the invention the wall portion between the shoulder 28 and tread portion of the tire is stocky and of narrow dimensions so that, in effect, engagement of the rim with the shoulder applies a part of the load directly on the tread of the tire independently of the fluid in the tire.

In Fig. 6 there is illustrated a form of the invention substantially identical to that shown in Figs. 1 to 3 with the exception that the side wall portions of the tire designated by the numeral 29 are more inclined with respect to the tread portion 30 thereof and at a greater angle to the central radial plane of the tire than are the side wall portions 22 of Figs. 1 to 3. Otherwise, corresponding parts of the forms shown in Figs. 1 to 3 are in Fig. 6 substantially identical therewith and hence designated by the same numerals.

Although but several specific embodiments of the invention are herein shown and described, it will be understood that various changes, including the size, shape and arrangement of parts, may be made without departing from the spirit of the invention.

What I claim is:

1. A vehicle tire and rim assembly including a hollow tire member of substantially greater width than thickness having a yieldable tread portion of substantially flat transverse cross section and opposite side wall portions formed in substantially angular relationship with respect to and of substantially less width than said tread portion, beads on the free edges of said side wall portions projecting outwardly relative to the central portion of said tire, a rim member confining the space between said side wall portions and having beads encompassing the beads of said tire member in hermetically sealed relation with respect thereto, means mounted on said rim for admitting fluid to the interior of said assembly, and spaced yieldable flanges between the side walls of said tire formed integrally with said tread portion and extending inwardly from the latter to locations spaced from said rim member, said flanges being disposed in planes normal to the axis of said rim for yieldably opposing movement of said tire tread toward said rim when said tire is deflated.

2. A vehicle tire and rim assembly including a hollow tire member of substantially greater width than thickness having a yieldable tread portion of substantially flat transverse cross section and opposite side wall portions formed in substantially angular relationship with respect to and of substantially less width than said tread portion, beads on the free edges of said side wall portions projecting outwardly relative to the central portion of said tire, a rim member confining the space between said side wall portions and having beads encompassing the beads of said tire member in hermetically sealed relation with respect thereto, and spaced yieldable flanges between the side walls of said tire formed integrally with said tread portion and extending inwardly from the latter to locations spaced from said rim member, said flanges being disposed in planes normal to the axis of said rim for yieldably opposing movement of said tire tread toward said rim when said tire is deflated.

WILLIAM G. WALLACE.